Dec. 2, 1930.  F. B. HALL  1,783,503
COMBINED PIPE TAPPING AND PLUG SETTING MACHINE
Filed Oct. 14, 1929
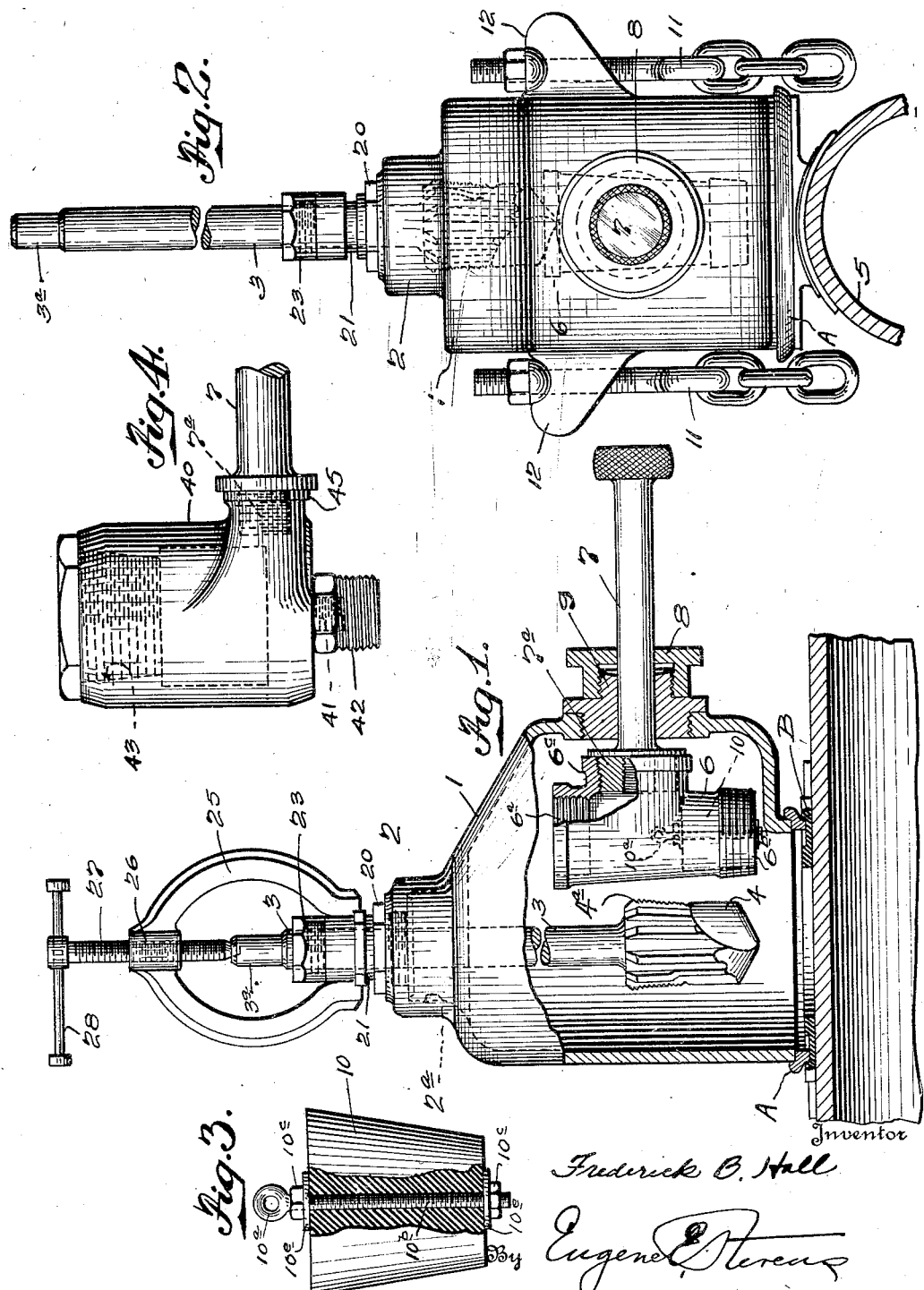
Inventor
Frederick B. Hall
By Eugene E. Stevens
His Attorney Patented Dec. 2, 1930

1,783,503

UNITED STATES PATENT OFFICE

FREDERICK B. HALL, OF RICHMOND, VIRGINIA

COMBINED PIPE-TAPPING AND PLUG-SETTING MACHINE

Application filed October 14, 1929. Serial No. 399,599.

My invention relates to a novel and improved machine for boring, tapping, and setting a plug or outlet connection in a gas or other main, and at the same time preventing the fluid from the main from escaping and interfering with the operator of the machine.

Briefly stated the invention has for one of its primary objects the provision of a machine of the class specified which is very simple in construction, easy to operate, relatively inexpensive of manufacture and which will be highly efficient in practical use.

Another object of the invention resides in the provision of novel setting means for the outlet connection and in means for sealing such outlet connection, while and immediately after, the same is being, or has been, screwed into place in the main.

Still another object of the invention is to provide a machine of this character wherein the outlet connection is screwed or set in place in the main by means of the instrumentality which drills and taps the hole in the main.

The invention also comprehends a novel attachment means, which may be used in association with the fitting setting means for inserting a plug in the main,—such attachment being actuated to thread said plug into the hole in the main by the action of the drill tap.

The invention also resides in certain novel features of construction, combination and arrangement of the various parts and in modes of operation, all of which will be readily understood by those skilled in the art upon reference to the accompanying drawing in connection with the detailed description to follow.

In the drawing,

Figure 1 is a view mainly in elevation, but partly broken and sections to show the supporting means or saddle and the elements within the casing;

Figure 2 is an end elevational showing the pipe or main in cross section;

Figure 3 is an elevational view, partly broken and partly in section,—of a novel sealing plug for insertion in the outlet fitting, and Figure 4 is a detail view of an attachment for use in connection with the device when it is desired to insert plugs in the main in lieu of the outlet fitting.

Referring specifically to the drawing wherein the same reference characters have been used to designate the same parts in all views, numeral 1 denotes a chamber or casing which is open at the bottom and is adapted to rest upon a saddle element A supported upon the gas main or pipe 5,—it being shown that the saddle rests upon a gasket B so as to effect a seal between the casing saddle and pipe.

The saddle, as shown, is centrally open so as to readily permit communication from the chamber to the pipe, so that the drilling element can be pressed against the latter. The casing 1 is provided at its top with a projecting boss-like element 2, which is chambered as at $2^a$ to receive the head or tapped portion $4^a$ of the drill 4 whose stem 3 extends up through the boss-like projection to be operated in the usual manner, either by a ratchet or otherwise as occasion may require.

Particular attention is directed to the headed drill taps 4, $4^a$,—it being noted that the drill portion 4 is diametrically smaller than the tap portion $4^a$. This being the case, it will be manifest that the head having been forced into contact with the pipe turning of the shaft or stem 3 will effect a boring or reaming out of the pipe for the insertion of the tapped head portion $4^a$ thereinto. Continued pressure and turning of the shaft or stem 3 will bring the tapped portion $4^a$ into the hole to produce the requisite tap for engagement of a sealing plug or an outlet connection, according to the desires in the particular instance.

Upon completion of the tap in the main 5 the stem 3 is turned in the reverse direction to unscrew the tap portion $4^a$ from the hole. Having freed the head portion $4^a$ from the hole the stem 3 is elevated so that the tap portion $4^a$ will be received in the boss-like portion 2 of the casing 1. In this position of the drill head, as shown in dotted lines in Figure 2, it will be manifest that the fitting or outlet connection 6 can be moved to axial alinement with the head 4, 4ª.

Figure 1 clearly discloses that the fitting 6 is provided with the usual lateral outlet neck 6ᶜ into which is threaded the threaded head or end 7ª of the setting stem 7, which is slidable in the central hole of the plug 9 and passes through the packing gland 8, all of which will be readily apparent from an inspection of Figure 1.

Accordingly, with the drill tap 4, 4ª in the dotted line position of Figure 2, it will be apparent that the stem 7 of the fitting carrier can be shoved forwardly to bring the fitting 6 in alinement with the drill head, as aforementioned. This having been accomplished the stem 3 of the drill tap will be forced downwardly. The upper tapped opening of the fitting 6, which is designated as 6ª, will be of sufficient size to receive the drill portion 4 of the drill tap, and the tapped hole in the fitting will be just the right size to receive the threads of the tap portion 4ª of the drill tap. Having screwed in the tap portion 4ª of the drill tap into the tapped hole 6ª at the upper end of the fitting, the stem 7 of the setting device can be turned to unscrew the head from the boss portion 6ᵇ of the fitting. In other words, the setting device 7 is backed off out of the way. Now, the drill tap stem 3 is turned in the usual manner to force the threaded end 6ᵇ of the fitting 6 into the tapped hole in the main 5, which has been formed as previously described. Of course, the threads of the end 6ᵇ of the fitting will be identical with the threads of the main 5. Having screwed the fitting 6 tightly into the hole 5 of the main, the shaft or stem 3 of the drill tap is given a quick sharp twist in the reverse direction so as to free the threads 4ª of the drill tap from the threads of the end 6ᶜ of the outlet fitting. Now, the drill tap may be pulled upwardly to the dotted line position leaving the fitting 6 firmly in place in the main.

It should be observed at this point, that Figure 1 shows in dotted lines within the outlet fitting 6, a novel sealing plug, which as clearly depicted is of truncated cone or frustro-conical form so as to wedge very tightly in the outlet fitting below the lateral outlet neck 6, as shown. This plug is designated at 10 and it will be manifest that the same serves to prevent the escape of fluid from the main, not only out through the top opening 6 of the fitting, but also prevents such escape through the lateral opening or neck 6ª.

After the job has been completed, as above described, the nuts 13 on the shank ends 14 of pipe embracing chain 11 are removed to free the chain from the lateral ears 12 of the casing. The casing 1 may now be lifted off the pipe or main 5. As shown, the rubber plug 10 has extending therethrough a threaded shank 10ᵇ with an eye 10ª at its upper end. Nuts 10ᶜ on the shank bear against washers 10ᵉ at opposite ends of the plug. By relative adjustment of nuts 10ᶜ the diameter of plug 10 can be varied and a tight fit in fitting 6 assured.

The only thing that remains to be done is to apply the permanent sealing plugs to the outlet 6ᶜ and 6ᵇ of the fitting 6. The workman will first apply a sealing plug of the flanged type or any other conventional form, to the tapped holes in the lateral neck 6ᶜ of the fitting. He may, of course, apply a service connection to such neck 6ᶜ, if he so desires, or if the particular case so demands.

In any event, after having sealed the outlet neck 6ᶜ the operator or workman will insert a plug into the upper end 6ª of the outlet fitting to make sure that such plug fits properly. It is to be observed that the tapped portion 4ª of the drill head will have cleaned or cleared the threads in the tapped end 6ª of the fitting so that the threads of the plug will take properly. Having satisfied himself that the plug may be readily and quickly screwed into place in the end 6ª the operator engages a hook into the eye 10ª of the rubber sealing plug 10 and quickly yanks the same out of place almost in the same motion applying his screw plug to the end 6ª of the fitting screwing the same tightly in place.

In connection with the foregoing description it is desired to point out and emphasize very definitely the advantages of preventing the escape of fluid from the main while a job of this character is being done. Of course, the objection to the escape of water will be apparent. Without this device, operation upon a water main would result in the operator being deluged as soon as the hole in the main is made. Furthermore, such escape of water would prevent the work from being done properly. However, the main value or the main necessity for this device resides in its application or rather to the work done of this nature upon gas mains. Gas as now manufactured is very dangerous to the health and the use, as ordinarily,—of gas masks is a most unhealthy and unsanitary resort in that mouth or lung diseases of one workman will be passed on to the next workman using the mask.

Respecting the operating means for the drill tap shaft 3, it is desired to point out that the stem 3 of the drill tap extends through the boss-like formation 2 of the casing 1 and thence through a plug of the hex-type which is screwed into the tapped end of such boss 2. This plug is denoted at 20 and as will be evident carries an integral upwardly extending superstructure providing an elongated bearing 21 for the stem 3,— the upper end of this superstructure being threaded to receive the clamp collar 23 of a packing gland.

The upper end of the shaft or stem 3 of the drill tap is square, as shown at 3ª, for the application of a ratchet wrench or the like.

The superstructure 21 of the hex-nut plug 20 carries the frame 25 which provides the concentric bearing 26 which is tapped for the pressure screw 27 which engages the end of the drill stem 3, so as to force the same into the pipe, particularly in the boring operation. In other words, the screw 26 turned by the handle 28 forces the stem into the pipe while the application of a ratchet wrench or the like to the squared end 3ª of the drill stem serves to rotate the latter in the tapping or boring operation.

In Figure 4 the device shown there comprehends a cylindrical fitting-like member 40, which has a cylindrical contour and a concentric threaded shank 41 at its lower end upon which is adapted to be screwed the socket end of a plug 42 whose opposite end is tapped to go in the hole bored into the main 5.

The upper end of the attachment or member 40 is provided with a tapped hole 43 to receive the tap portion 4ª of the drill so that the member 40 can be rotated to screw the plug 41 into the main. Of course, the member 40 is provided with an elongated opening to receive the drill portion 4 of the drill tap.

The member 40 has a lateral boss 45 so that the headed end 7ª of the member 7 can be screwed thereinto to set the same in place in the same fashion as the fitting 6 was set in place, as previously explained.

Having thus described my invention, what I claim and desire to secure by Letters Patent is:

1. In an enclosed drill tap and fixture setting device for pipes and mains, a casing, a plug threaded into one side of the casing, a rod having a threaded head for engaging a side of the fixture, the rod passing through said plug, a combined drill and tap having a shank passing through the casing wall, both the drill tap and fixture carrying rod operable exteriorally of the casing and being movable in intersecting paths, the combined drill and tap being adapted to drill and tap an aperture in the main for inserting therein an externally threaded end of the fixture, and further so arranged as to engage an internally threaded portion of the fixture for operatively inserting said externally threaded end into the main.

2. In an enclosed drill tap and fixture setting device for pipes and mains, a casing having a plurality of apertures extending at right angles therethrough, a rod having a threaded head passing through one of the apertures, said threaded head adapted to engage an internally threaded side portion of the fixture, a combined pipe drill and tap having a shank passing through the other aperture, said combined pipe drill and tap adapted to drill and tap a hole in the main, into which an externally threaded end of the fixture is inserted by the engagement of the combined drill and tap with an internally threaded end of the fixture.

3. In an enclosed drill tap and fixture setting device for pipes and mains, a casing having a pair of apertures therethrough, a rod having a threaded head passing through one of the apertures, said head adapted to be inserted in a side portion of the fixture, a combined drill and tap having a shank passing through the other aperture, said combined pipe drill and tap adapted to drill and tap a hole in the main, and then to be withdrawn upwardly into the casing, after which the fixture is brought into position by the head carrying rod so that a top portion of the fixture may be engaged by the pipe drill and tap to be screwed into the main after the rod has been disengaged from the side portion of the fixture.

In testimony whereof I affix my signature.

FREDERICK B. HALL.